(12) United States Patent
Yacov et al.

(10) Patent No.: US 10,110,740 B2
(45) Date of Patent: Oct. 23, 2018

(54) SYSTEMS AND METHODS FOR PROVIDING CALL VERIFICATION

(71) Applicant: VONAGE BUSINESS INC., Atlanta, GA (US)

(72) Inventors: Shay Ben Yacov, Tel Aviv (IL); Iliya Barenboim, Ramat Gan (IL); Romi Gubes, Ra'anana (IL); Itay Bianco, Tel-Aviv (IL); Srivatsan Srinivasan, San Francisco, CA (US)

(73) Assignee: Vonage Business Inc., Atlanta, GA (US)

( * ) Notice: Subject to any disclaimer, the term of this patent is extended or adjusted under 35 U.S.C. 154(b) by 27 days.

(21) Appl. No.: 15/468,805

(22) Filed: Mar. 24, 2017

(65) Prior Publication Data

US 2018/0278746 A1 Sep. 27, 2018

(51) Int. Cl.
| | |
|---|---|
| H04M 3/436 | (2006.01) |
| H04M 7/00 | (2006.01) |
| H04L 29/08 | (2006.01) |
| H04W 4/12 | (2009.01) |
| H04W 12/12 | (2009.01) |
| H04W 80/10 | (2009.01) |

(52) U.S. Cl.
CPC ............ *H04M 3/436* (2013.01); *H04L 67/02* (2013.01); *H04L 67/146* (2013.01); *H04L 67/26* (2013.01); *H04M 7/0012* (2013.01); *H04M 7/0078* (2013.01); *H04W 4/12* (2013.01); *H04W 12/12* (2013.01); *H04M 2203/6072* (2013.01); *H04W 80/10* (2013.01)

(58) Field of Classification Search
CPC ................. H04W 12/06; H04W 12/12; H04M 2203/6054; H04M 3/436; H04M 7/0078
See application file for complete search history.

(56) References Cited

U.S. PATENT DOCUMENTS

| | | | | |
|---|---|---|---|---|
| 2009/0190737 | A1* | 7/2009 | Dunmire | G10L 17/02 379/207.13 |
| 2015/0271327 | A1* | 9/2015 | Dow | H04M 3/436 379/142.05 |
| 2017/0104870 | A1* | 4/2017 | Mandanapu | H04M 3/42059 |

* cited by examiner

*Primary Examiner* — Nafiz E Hoque
(74) *Attorney, Agent, or Firm* — Moser Taboada

(57) ABSTRACT

Systems and methods for providing call verification to prevent voice phishing, comprising: receiving a call request from a service provider to establish a call with a client device associated with the client of the service provider; verifying the identity of the service provider; transmitting a notification to the client device that includes an indication that an incoming call is from a verified service provider; receiving verification information about the client; verifying the identity of the client; and establishing the call between the service provider and the client after both the identity of the service provider and the identity of the client are verified.

21 Claims, 5 Drawing Sheets

SYSTEMS AND METHODS FOR PROVIDING CALL VERIFICATION

BACKGROUND OF THE INVENTION

Field of the Invention

Embodiments of the present invention relate generally to communication systems for call verification and, more particularly, to methods and systems for call verification to prevent voice phishing.

Description of the Related Art

Voice phishing (or vishing) is a criminal practice involving, for example caller ID spoofing in which a number of the caller's choosing is displayed on the recipient's phone. Voice phishing is typically used to steal credit card numbers or other sensitive information from individuals, where the information can later be used in identity theft schemes. For example, a criminal caller may place a call to an unsuspecting recipient, but replace his or her phone number with that of a bank. To the recipient, it appears the call is coming from the recipient's bank. The criminal caller may ask for sensitive information such as a social security number, birthdate, and the like. Since the call appears to come from the recipient's bank, the recipient may unwittingly expose their personal details to a criminal caller.

It is difficult for legal authorities to monitor and trace voice phishing. To protect themselves from voice phishing, consumers are advised to be highly suspicious when a business asks for personal information over the telephone. As such, service providers look for methods to protect their customers, so the customers can trust the caller.

Accordingly, there exists a need in the art for methods and systems for providing call verification to prevent voice phishing.

SUMMARY OF THE INVENTION

Systems and methods for providing call verification to prevent voice phishing are provided herein. In some embodiments, the system may include a verification system configured to: receive a call request from the service provider to establish a call with a client device associated with the client of the service provider; verify the identity of the service provider; transmit a notification to the client device that includes an indication that an incoming call is from a verified service provider; receive verification information about the client; verify the identity of the client; and establish the call between the service provider and the client after both the identity of the service provider and the identity of the client are verified.

In some embodiments, the method for providing call verification to prevent voice phishing may comprise: receiving a call request from a service provider to establish a call with a client device associated with the client of the service provider; verifying the identity of the service provider; transmitting a notification to the client device that includes an indication that an incoming call is from a verified service provider; receiving verification information about the client; verifying the identity of the client; and establishing the call between the service provider and the client after both the identity of the service provider and the identity of the client are verified.

Other and further embodiments of the present invention are described below.

BRIEF DESCRIPTION OF THE DRAWINGS

So that the manner in which the above recited embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
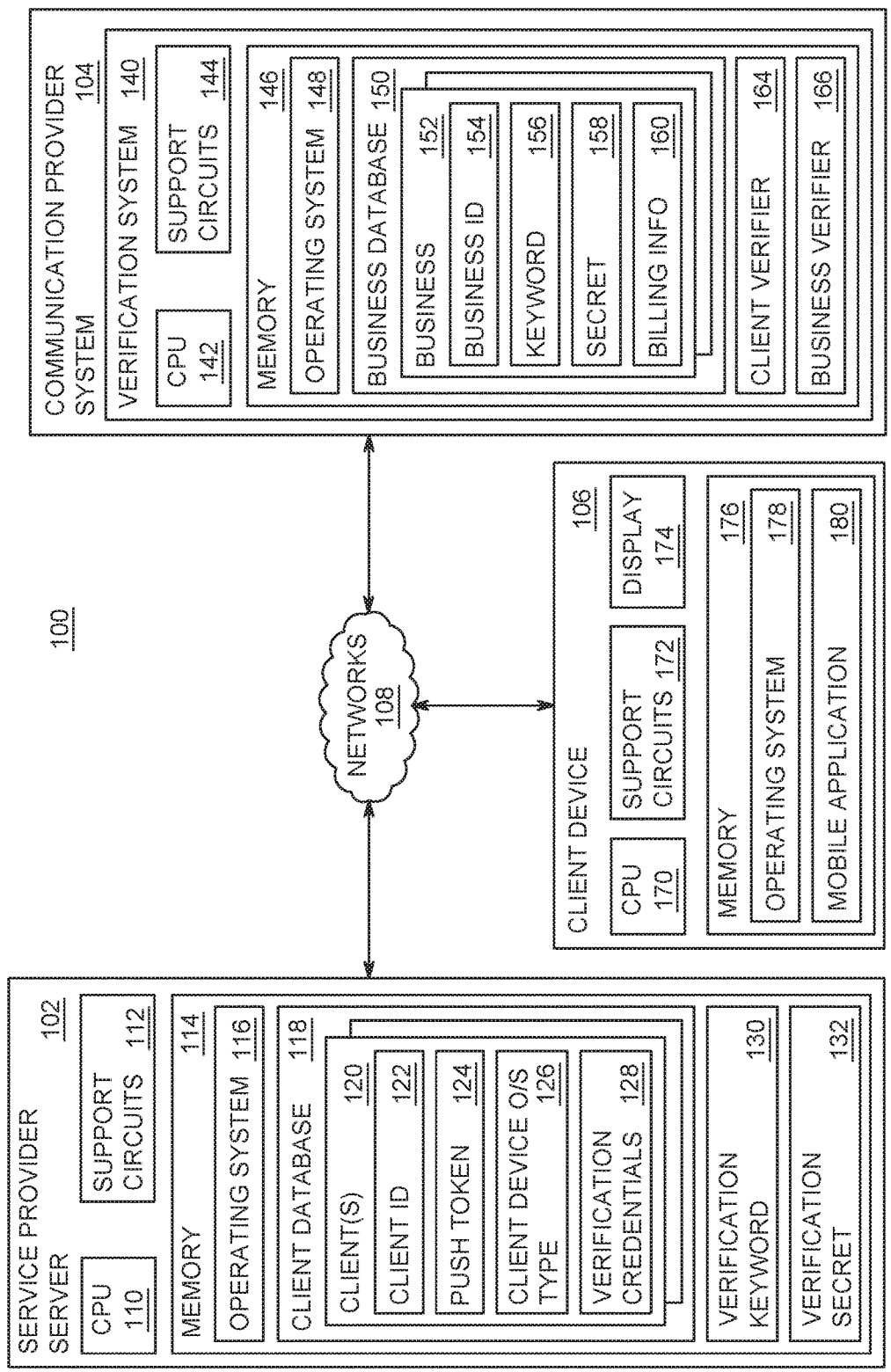
FIG. 1 is a block diagram of a communication system for providing call verification to prevent voice phishing in accordance with one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments consistent with the present invention are directed to methods and systems for providing call verification to prevent voice phishing. Specifically, when a caller, such as a business (e.g., a bank, insurance company, etc.), places a call to a client, a call verification system authenticates the caller (i.e., the business). The verification system then sends the client a notification that a call is incoming and that the caller has been verified. The notification also includes a mechanism for the callee (i.e., the client) to be verified by the call verification system such that the caller may be assured the callee is the client who the caller is expecting. Upon verification of both the business and the client, the call is connected. Advantageously, a business can use the services provided by the call verification system, to ensure the client is indeed the recipient to whom the business placed the call, and the client is assured that the caller is who they say they are so the caller may be comfortable sharing sensitive information over the phone.

Although the present disclosure describes a caller as being a business, those skilled in the art will appreciate that any service provider that has a plurality of clients with whom they interact may use the disclosed invention. In the present disclosure the words "business", "caller", and "service provider" are used interchangeably. Those skilled in the art will also appreciate the present disclosure may be used by a non-business user in order to verify a contact using the verification techniques. For example, a user and a contact of the user may decide on a common "safe word" in advance and verify each other using the safe word. Other techniques for verification are disclosed below.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for providing call verification to prevent voice phishing in accordance with one or more embodiments of the invention. The system 100 comprises a service provider server 102, a communication provider system 104, and a client device 106, communicatively coupled via networks 108.

The service provider server 102 may comprise a Central Processing Unit (CPU) 110, support circuits 112, and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output device and circuits, and the like. The memory 114 comprises at least one of Read Only Memory (ROM), Random Access Memory (RAM), disk drive storage, optical storage, removable storage and/or the like. In some embodiments, the memory 114 comprises an operating system 116, a client database 118, a verification keyword 130 (e.g., an application programming interface (API) key), and a verification secret 132 (e.g., an API secret). An API key is a public unique identifier that identifies the business to verification system 140, which is part of communication provider system 104. An API secret is a secret shared between the business and the verification system 140 and is used for authenticating the business to the verification system 140. The client database 118 comprises a plurality of clients 120, wherein each client 120 comprises a unique client identifier (ID) 122 (e.g., a telephone number), a push token 124, a client device operating system type 126, and verification credentials 128. Verification credentials 128 may include for example, a code or passphrase, user identifier and password, or any item that may be used to verify the identity of the client.

The operating system (OS) 116 generally manages various computer resources (e.g., network resources, file processors, and/or the like). The OS 116 is configured to execute operations on one or more hardware and/or software modules, such as Network Interface Cards (NICs), hard disks, virtualization layers, firewalls and/or the like. Examples of the OS 116 may include, but are not limited to, various versions of LINUX, MAC OSX, BSD, UNIX, MICROSOFT WINDOWS, IOS, ANDROID and the like. In some embodiments, OS 116 may include an application programming interface (API) which can be used to access and client device information and features (such as, for example, mobile application 180 on client device 106).

In some embodiments, the client device 106 may be a mobile computing device. Client device 106 may comprise a Central Processing Unit (CPU) 170, support circuits 172, a display 174, and a memory 176 that includes an operating system 178, the mobile application 180. The CPU 170 may comprise one or more commercially available microprocessors or microcontrollers that facilitate data processing and storage. The various support circuits 172 facilitate the operation of the CPU 170 and include one or more clock circuits, power supplies, cache, input/output device and circuits, and the like. The memory 176 comprises at least one of Read Only Memory (ROM), Random Access Memory (RAM), disk drive storage, optical storage, removable storage and/or the like.

The operating system (OS) 178 generally manages various computer resources (e.g., network resources, file processors, and/or the like). The OS 178 is configured to execute operations on one or more hardware and/or software modules, such as Network Interface Cards (NICs), hard disks, virtualization layers, firewalls and/or the like. Examples of the OS 178 may include, but are not limited to, various versions of LINUX, MAC OSX, BSD, UNIX, MICROSOFT WINDOWS, IOS, ANDROID and the like. In some embodiments, OS 178 may include an application programming interface (API) that can be used to access client device information and features (such as, for example, by mobile application 180. In some embodiments, the mobile application 180 may be any app that is associated with a business, for example, a mobile banking app, insurance portal, and the like. In some embodiments, the mobile application 180 is a VoIP app that provides over-the-top (OTT) VoIP telephony services to an end-user. In some embodiments, the mobile app 180 is a third-party app, such as a social media app or a security app. Although the mobile app 180 is described herein as a separate stand-alone application, in some embodiments the mobile application 180 may be integrated into OS 178, and may use existing API calls provided by the OS 178 to access or control various features of client device 106. When the mobile application 180 is first registered, for example, when the client opens the mobile application 180 for the first time, the mobile application 180 registers a PUSH token that is stored on a server. As an example, if the mobile application is a mobile banking app, the PUSH token and the type of operating system used on the client device is stored on the banking server. If the mobile application is a VOIP app, the PUSH token and the type of operating system used on the client device is stored on the VOIP service provider server.

The communication provider system 104 may be a communication service provider, such as a VoIP service provider, that includes and maintains verification system 140. In other embodiments, verification system 140 may be a separate entity that provides call verification services to communication provider system 104, or to businesses, by agreement. The verification system 140 may be an external cloud-based service and not part of the communication provider system 104. The verification system 140 verifies the identity of a business to a client and vice versa to prevent voice phishing. An exemplary verification system 140 may be NEXMO®, A VONAGE® API Platform.

The verification system 140 may include a Central Processing Unit (CPU) 142, support circuits 144, and memory 146. The CPU 142 may comprise one or more commercially available microprocessors or microcontrollers that facilitate data processing and storage. The various support circuits 144 facilitate the operation of the CPU 142 and include one or more clock circuits, power supplies, cache, input/output circuits, and the like. The memory 146 comprises at least one of Read Only Memory (ROM), Random Access Memory (RAM), disk drive storage, optical storage, removable storage and/or the like. In some embodiments, the memory 146 comprises an operating system 148, a business database 150, a client verifier 164, and a business verifier 166. The operating system 148 generally manages various computer resources (e.g., network resources, file processors, and/or the like). The operating system 148 is configured to execute operations on one or more hardware and/or software modules, such as Network Interface Cards (NICs), hard disks, virtualization layers, firewalls and/or the like. Examples of the operating system 148 may include, but are not limited to, various versions of LINUX, MAC OSX, BSD, UNIX, MICROSOFT WINDOWS, IOS, ANDROID and the like.

In some embodiments, the business database 150 may store information associated with one or more businesses 152 that are provided verification services by the verification system 140. When a business signs up for verification services with the verification system 140, the business is assigned a verification keyword 156 (e.g., an API key), and a verification secret 158 (e.g., an API secret), which are stored with a unique business identifier 154 in the business database 150.

The networks 108 comprise one or more communication systems that connect computers by wire, cable, fiber optic and/or wireless link facilitated by various types of well-known network elements, such as hubs, switches, routers, and the like. The networks 108 may include an Internet Protocol (IP) network, a public switched telephone network (PSTN), or other mobile communication networks, and may employ various well-known protocols to communicate information amongst the network resources.

Although the client database 118 is shown on service provider server 102, in some embodiments, the client database 118 may be located on verification system 140 or communication provider system 104.

In operation, a salesperson or other business employee places a call to a client associated with client device 106. The call request may be for example, an API call, an HTTP request, a SIP request, or any other protocol to communicate the call request. The business caller may place the call from a dashboard app, a VOIP app, or the like. In some embodiments, the client may be identified using dual tone multi-frequency signaling (DTMF) to an interactive voice response (IVR) system, or speech to text. The business caller may enter a client name or client phone number. The client name is translated using a lookup table to determine the client phone number. Whether the call request is directed through a communication provider system or directly through the verification system, the call is not established until the identities of both the caller and callee are verified. In some embodiments, the call is placed on hold until the client is verified and subsequently connected to the call. In some embodiments, the call is not established until verification of both the caller and callee is complete. In some embodiments, an API call is generated and sent to the verification system 140. The API call includes at least the client ID 122 (i.e., phone number), the verification keyword 130, and the verification secret 132. The business verifier 166 uses the verification secret 132 to read the API call. The verification keyword 130 identifies the business 152 that is placing the call by comparing the verification keyword received in the API call to the keyword 156 in the business database 150. If the keyword 130 in the API call matches the keyword 156 in the business database 150, the identity of the business is determined to be verified to the communication provider. The business must then be verified to the callee.

If the business caller placed a call from an app, such as a VoIP app, the business verifier 166 sends a PUSH notification to the business caller's VoIP app. In some embodiments, the business caller is provided a way to verify him or herself. For example, the PUSH notification may include a universal resource locator (URL) that the business caller selects in order to arrive at a webpage where the business caller may verify him or herself. The verification credentials 128 for the client (i.e., callee) may include a passphrase previously selected by the client. Upon navigating to webpage, the business caller may see displayed a list of, for example, ten words or phrases, one of which is the passphrase and nine are dummy phrases. The business caller selects the passphrase, previously agreed upon by the client, from the ten words or phrases. The business verifier 166 compares the selected passphrase to the stored verification credentials 128. A correct selection is determined to be verification of the identity of the business caller. Conversely, an incorrect selection indicates the business caller is not who they claim to be.

If the business caller did not place the call from an app, such as a VoIP app, the business caller may be sent an SMS text or email message that includes the URL where the business caller may verify him or herself.

Once the identity of the business is verified, the verification system 140 attempts to verify the client to whom the business placed the call. Verifying the client ensures that the person who answers the phone is the client the business wants to speak with. In order to verify the identity of the client, the client verifier 164 sends a notification to the client indicating that a call is incoming from a verified business. The notification may identify the business and indicate that the caller has been verified. The notification may include a request that the user of the client device verify him or herself to the business. If the client device 106 includes a mobile app 180 either associated with the business, a VOIP app, a social media app, or the like, the client verifier 164 may verify the identity of the client by sending a PUSH notification to the mobile app 180 on the client device 106. In order to send the PUSH notification, the client verifier 164 must have the client's PUSH token 124 that identifies the mobile app 180 where the PUSH notification is to be sent, a type of the client device operating system 126, and verification credentials 128 that may be used to verify the identity of the client. If the client device 106 does not include a mobile app 180 that can receive PUSH notifications, the client verifier 164 may send a short message service (SMS) text to the client device 106 or send an email to the client. The PUSH notification/SMS text/email indicates that the identity of the business calling has been verified and also includes a way for the client to verify themselves to the verification system 140.

In some embodiments, if the call request was an API call, the API call received on the verification system 140 includes the PUSH token 124, type of client device operating system 126, and verification credentials 128 of the client to whom the business is placing the call. In some embodiments, the client verifier 164 generates an API call and sends the API call to the service provider server 102, to access information associated with the client 120. The information associated with the client may include the PUSH token 124, type of client device operating system 126, and verification credentials 128. In the event the client device 106 does not include a mobile app 180, the response from the service provider server 102 will not have a PUSH token nor a type of client device operating system stored for the client 120. In such instance, the service provider server 102 may simply return the verification credentials 128 of the client 120. In some embodiments, the service provider server 102 may also return an email address associated with the client 120.

If the client device 106 includes a mobile app 180, the client verifier 164 sends a PUSH notification to the mobile app 180 indicating that there is an incoming call from a business and that the business has been verified. In some embodiments, the PUSH notification includes the telephone number that is going to call the client. In some embodiments, when it is determined that the PUSH notification arrived at the mobile app 180, the call from the business to the client is connected. In some embodiments, the client is shown a way to verify him or herself. For example, the PUSH notification may include a universal resource locator (URL) that the client must select in order to navigate to a webpage where the client may verify him or herself. For example, the verification credentials 128 may include a passphrase previously selected by the client. The webpage may include a list of, for example, ten words or phrases, one of which is the passphrase and nine are dummy phrases. In some embodiments, the business caller may be verified to the client by seeing that the passphrase exists in the list. In order for the client to verify back to the business caller, the client must select his or her previously selected passphrase from the ten words or phrases. The client verifier 164 compares the selected passphrase to the stored verification credentials 128. A correct selection is determined to be verification of the identity of the client. In such embodiments, only after the client is verified is the call between the business and the client connected. In some embodiments, the client may be asked to enter his or her username and password, or a one-time password, which are then sent to the verification system 140 for evaluation. In some embodiments, upon receipt of the PUSH notification, the client's credentials (e.g., username and password) are automatically sent from the mobile app 180 to the verification system 140.

In the event the client device 106 does not include a mobile app 180, the client verifier 164 may send the client device 106 an SMS text that includes the URL where the client may verify him or herself. In some embodiments, a third party app may provide a notification to the client regarding the incoming call from the verified business. For example, if the call is coming from a bank and the bank has a webpage on, for example FACEBOOK, the notification may be delivered to the client device 106 via the bank's FACEBOOK page.

Only after the identities of both the business and the client are verified, is the call between the two parties connected.

Figure 2:
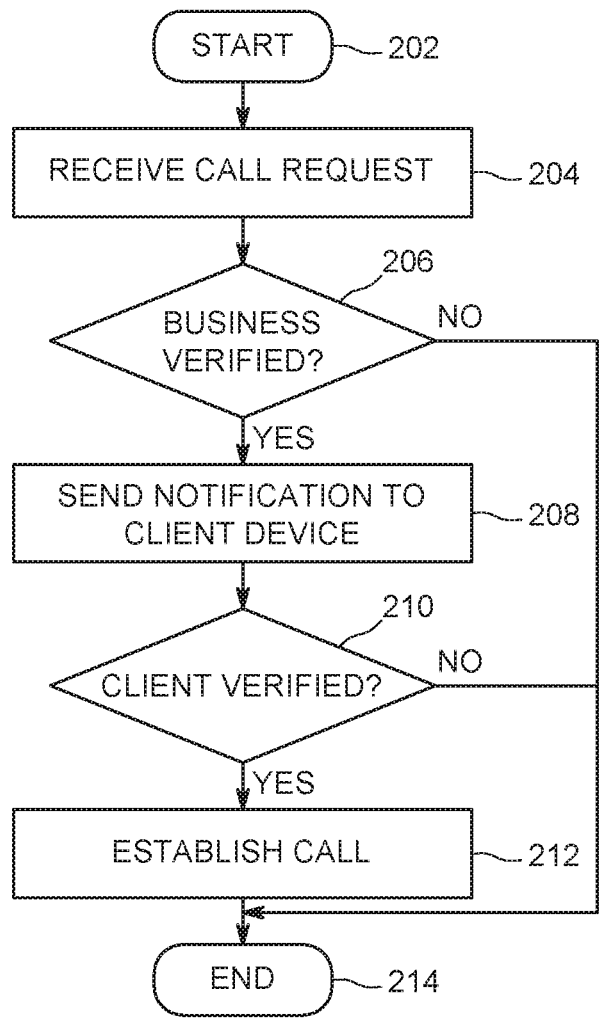
FIG. 2 is a flow diagram of an exemplary method for providing call verification to prevent voice phishing in accordance with one or more embodiments of the invention.

Exemplary methods that may be performed by one or more elements of system 100 for providing call verification to prevent voice phishing are described below with respect to FIG. 2. FIG. 2 is a flow diagram of an exemplary method 200 for providing call verification in voice telephony communications. The method 200 starts at 202 and proceeds to 204.

At 204, the verification system 140 receives a call request from someone associated with a business. The call request is directed to a client of the business. The call request may be in the form of an API call, an HTTP request, a SIP request, and the like. In some embodiments, the API call includes identification information associated with the business initiating the call to the client. The identification information about the business may include, but is not limited to, the verification keyword 130 and the verification secret 132 of a business, a client ID 122 associated with a client 120, and the like.

At 206, the verification system 140 verifies the business, as described in further detail with respect to FIG. 3 below. If at step 206, it is determined that the business cannot be verified, then the method proceeds to step 214 and ends. However, if at step 206, if the business is verified, then at step 208, a notification is sent to the client device indicating that a call request was received from a business and the business has been verified.

At step 210, it is determined whether the person who at the client device is indeed the client to whom the business would like to speak, as described in further detail with respect to FIG. 4, below.

If at step 210, it is determined that the client cannot be verified, then the method proceeds to step 214 and ends. However, if at step 210, it is determined that the person at the client device is indeed the client to whom the business would like to speak, then at step 212, the call between the business and the client is connected. Thus, the client and business may exchange sensitive information without worrying about voice phishing. The method 200 ends at step 214.

Figure 3:
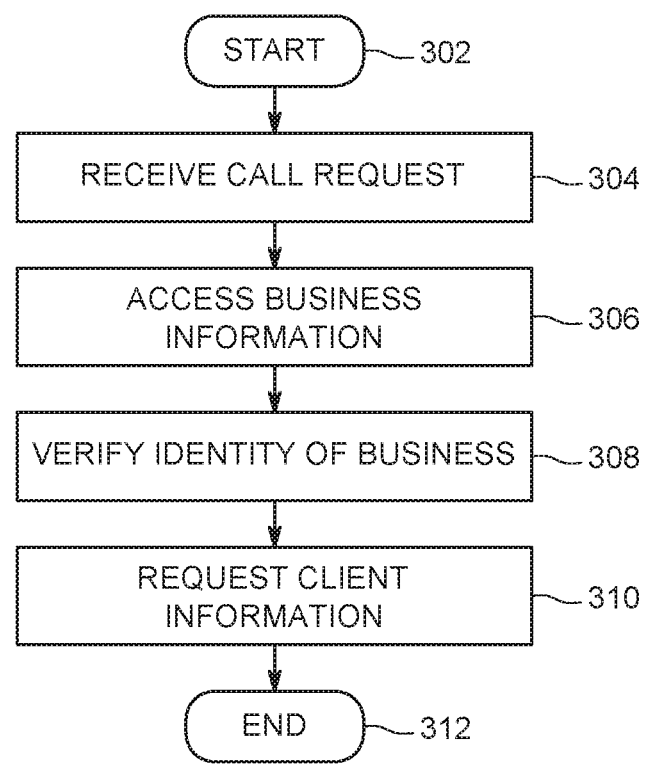
FIG. 3 is a flow diagram of an exemplary method for verifying the identity of a caller in accordance with one or more embodiments of the invention.

FIG. 3 is a flow diagram of an exemplary method 300 for verifying the identity of a caller in accordance with one or more embodiments of the invention. The method 300 starts at step 302 and proceeds to step 304.

At step 304, the call request is received. If the call request is an API call, the verification system 140 receives the API call which includes the verification keyword and verification secret of the business. The verification keyword and verification secret are extracted from the API call. The verification keyword identifies the business to the verification server. The secret is used to authenticate the business as only the business and the verification system share the secret.

At 306, the verification information for the business is retrieved from a database on the verification system. The verification secret associated with the verification keyword is retrieved.

At step 308, it is determined whether the verification keyword and verification secret received in the API call match the verification keyword and verification secret that were previously assigned to the business and stored in the business database. If the information matches, then the business is determined to be verified by the verification system. If the information does not match, then it is determined that the caller is not the indicated business and is rather, voice phishing. The business caller is then verified to the client.

If the business caller placed a call from an app, such as a VoIP app, the business verifier 166 sends a PUSH notification to the business caller's VoIP app. In some embodiments, the business caller is shown a way to verify him or herself. For example, the PUSH notification may include a universal resource locator (URL) that the business caller may navigate to in order to verify him or herself. For example, the verification credentials 128 for the client (i.e., callee) may include a passphrase previously selected by the client. The URL may include a list of, for example, ten words or phrases, one of which is the passphrase and nine are dummy phrases, and the business caller must select the passphrase, previously agreed upon by the client, from the ten words or phrases. The business verifier 166 compares the selected passphrase to the stored verification credentials 128. A correct selection is determined to be verification of the identity of the business caller. If the business caller did not place the call from an app, such as a VoIP app, the business caller may be sent an SMS text or email message that includes the URL where the business caller may verify him or herself.

If at step 308 the identity of the business is verified, and the client information was not sent with the initial call request, then at step 310, an API call may be generated and sent to a service provider server to request information for the client. The information may include a PUSH token, a type of operating system of the client device, verification credentials, an email address, and the like. The method ends at step 312.

Figure 4:
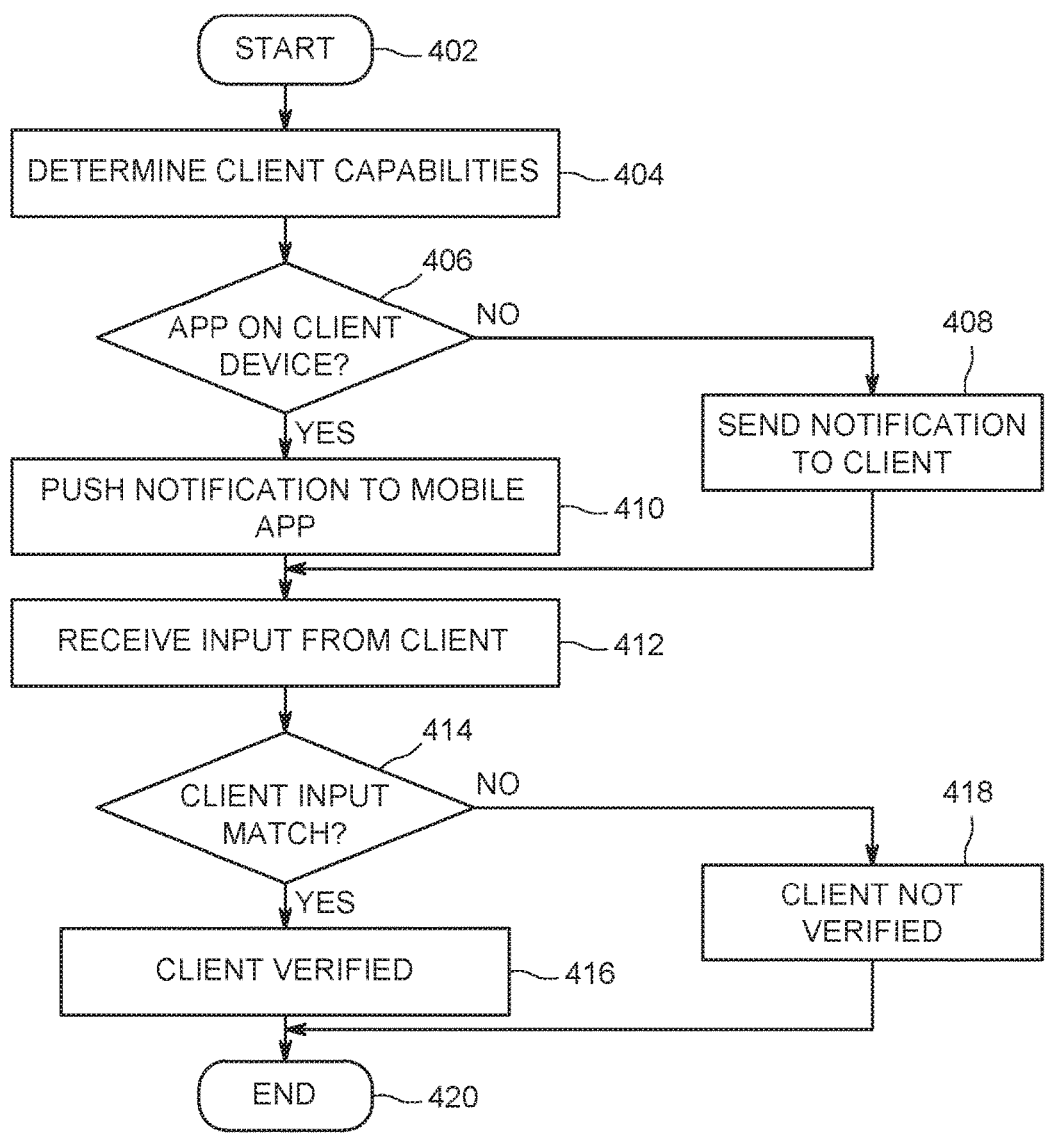
FIG. 4 is a flow diagram of an exemplary method for verifying the identity of a client in accordance with one or more embodiments of the invention.

FIG. 4 is a flow diagram of an exemplary method 400 for verifying the identity of a client in accordance with one or more embodiments of the invention. The method 400 starts at step 402 and proceeds to step 404.

At step 404, the client device capabilities are determined based on the information received in response to the API call. The client device may include a mobile app that is capable of receiving a PUSH notification. Without a mobile app, a notification may be sent using, for example an SMS text message, an email message and the like.

At step 406, it is determined whether the client device includes a mobile app. If the information received from the API call includes a PUSH token and a type of operating system of the client device, then it is determined that the client device includes a mobile app. However, if a PUSH token and type of operating system are not received in response to the API call, then it is determined that the client device does not include a mobile app. If at step 406, it is determined that the client device includes a mobile app, then the method proceeds to step 410.

At step 410, a PUSH notification is sent to the mobile app on the client device indicating a phone number of a verified incoming call. The PUSH token received in the API call operates as an address that identifies the app on the client device where the PUSH notification is to be sent. In some embodiments, the notification may trigger the mobile app to return client credentials stored in the mobile app to verify the client. In some embodiments, the PUSH notification indicates a URL for a webpage where the client may go to verify him or herself in response to a verification challenge.

If at step 406, it is determined that the client device does not include a mobile app, then at step 408, an SMS message or an email message is generated and sent to the client device. The SMS or email message includes the URL where the client may go to verify him or herself.

At step 412, input is received from the client in response to a verification challenge. In some embodiments, a URL where the client verifies him or herself may include a list of, for example, ten words or phrases, one of which is the passphrase and nine are dummy phrases. The list is generated by a client verifier and includes a passcode that was preselected by the client and stored on the service provider server as verification credentials. The client may select the passcode from the list of words or phrases. The selection is compared to the client's verification credentials that were received in the API call to the service provider server. If the correct passcode was selected, the client is determined to be verified. In some embodiments, the URL displays input areas for the client to input a login and password. In some embodiments, the URL includes a selection of PINs for the client to select or an input area where the client may enter their PIN. Any method of checking a client against the previously stored verification credentials of the client may be utilized to verify the client.

If the verification credentials match the client input, then at step 416, the client is verified. However if the verification credentials do not match the client input, then at step 418, the client is determined to be not verified. The method 400 ends at step 420.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
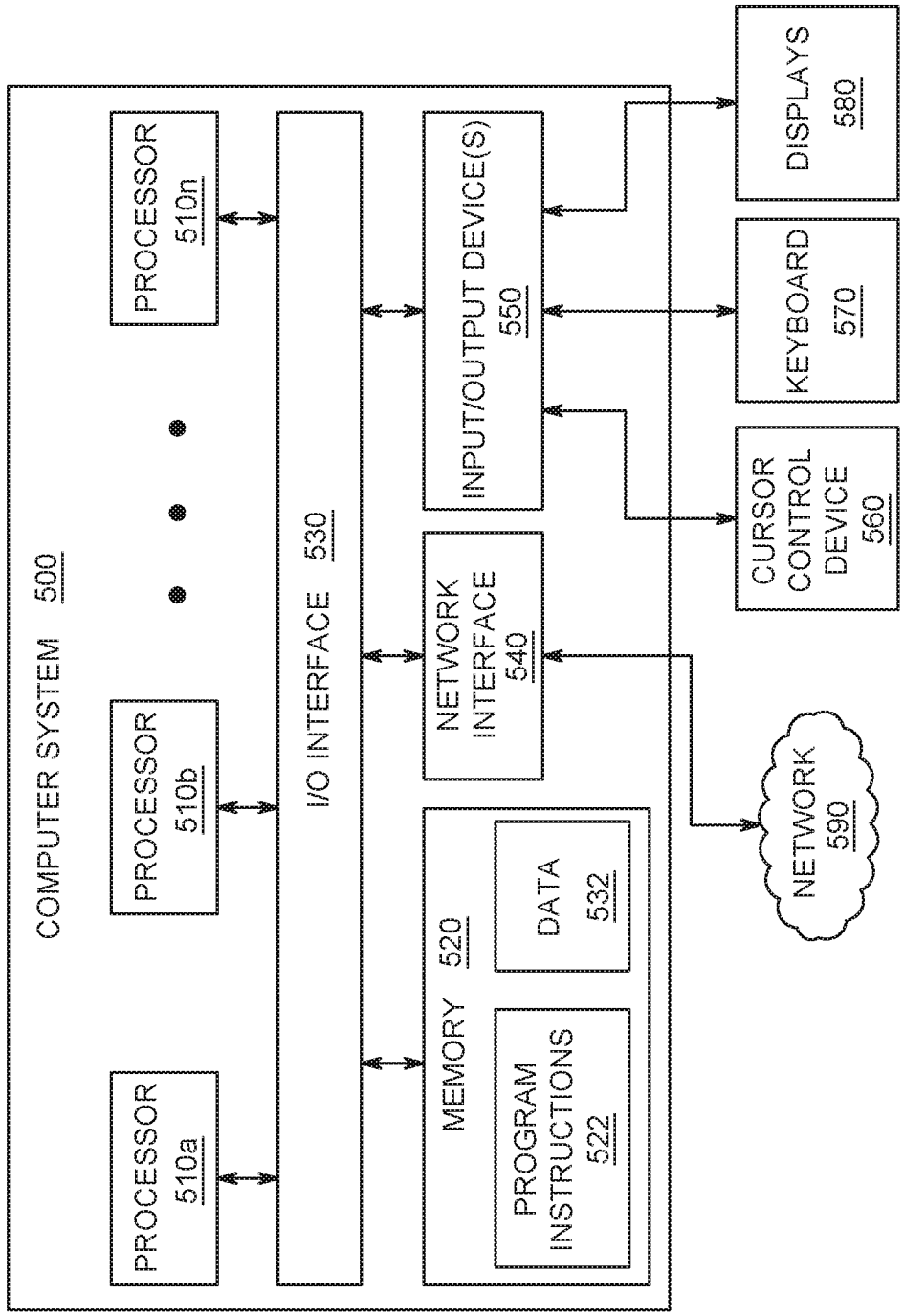
FIG. 5 is a depiction of a computer system that can be utilized in various embodiments of the present invention.

FIG. 5 depicts a computer system 500 that can be utilized in various embodiments of the present invention to implement the computer and/or the display, according to one or more embodiments.

Various embodiments of method and apparatus for providing call verification to prevent voice phishing, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the methods 200, 300 and 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive client input described above. In various embodiments, a client interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowchart of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A verification system for providing call verification, comprising:
   a) at least one processor;
   b) at least one input device; and
   c) at least one storage device storing processor-executable instructions which, when executed by the at least one processor, perform a method to:
   receive a call request from a service provider to establish a call with a client device associated with the client of the service provider; verify the identity of the service provider;
   transmit a notification to the client device that includes an indication that an incoming call is from a verified service provider;
   receive verification information about the client; verify the identity of the client;
   establish the call between the service provider and the client after both the identity of the service provider and the identity of the client are verified;
   wherein verifying the identity of the service provider comprises:
   providing a universal resource locator (URL) to the service provider, wherein the URL directs the service provider to a webpage for providing verification information;
   receiving, on the webpage, input from the service provider in response to a verification challenge; and
   verifying the received input matches preselected verification information associated with the client of the service provider.

2. The verification system of claim 1, wherein the call request is an application programming interface (API) call.

3. The verification system of claim 1, wherein the call request is one of an HTTP request or a SIP request.

4. The verification system of claim 1, wherein the call request comprises verification credentials for verifying the client.

5. The verification system of claim 1, wherein the notification is a PUSH notification to a mobile application on the client device.

6. The verification system of claim 5, wherein the mobile application is a mobile application associated with the service provider.

7. The verification system of claim 1, wherein the notification is one of a short message service (SMS) text message or email text message.

8. The verification system of claim 7, wherein the indication included in the notification is a passphrase previously provided to the service provider by the client.

9. The verification system of claim 8, wherein the passphrase is included along with a plurality of dummy phrases.

10. The verification system of claim 1, wherein the notification includes a universal resource locator (URL), wherein the URL is an address of a webpage that comprises an input area for the client to provide verification information in response to a verification challenge.

11. The verification system of claim 1, wherein the indication included in the notification is a universal resource locator (URL) of a webpage that includes a selectable list of phrases, wherein the list of phrases includes (a) a verification passphrase previously provided to the service provider by the client and (b) a plurality of dummy phrases.

12. The verification system of claim 11, wherein the method performed further comprises, receiving a selection by the client of the verification passphrase previously provided to the service provider by the client.

13. A computer-implemented method for providing call verification, comprising:
   receiving an application programming interface (API) call from a service provider to establish a call with a client device associated with the client of the service provider;
   verifying the identity of the service provider;
   transmitting a notification to the client device that includes an indication that an incoming call is from a verified service provider;
   wherein verifying the identity of the service provider comprises:
   providing a universal resource locator (URL) to the service provider, wherein the URL directs the service provider to a webpage for providing verification information;
   receiving, on the webpage, input from the service provider in response to a verification challenge; and
   verifying the received input matches preselected verification information associated with the client of the service provider.

14. The computer-implemented method of claim 13, further comprising:
   receiving verification information about the client;
   verifying the identity of the client; and
   establishing the call between the service provider and the client after both the identity of the service provider and the identity of the client are verified.

15. The computer-implemented method of claim 13, wherein the API call comprises verification credentials for verifying the client.

16. The computer-implemented method of claim 13, wherein the notification is a PUSH notification to a mobile application on the client device.

17. The computer-implemented method of claim 16, wherein the mobile application is a mobile application associated with the service provider.

18. The computer-implemented method of claim 13, wherein the notification is one of a short message service (SMS) text message or email text message.

19. The computer-implemented method of claim 13, wherein the notification includes a universal resource locator (URL), wherein the URL is an address of a webpage that comprises an input area for the client to provide verification information in response to a verification challenge.

20. A non-transitory computer readable medium for storing computer instructions that, when executed by at least one processor causes the at least one processor to perform a method for providing call verification to prevent voice phishing, comprising:
   receiving a call request from a service provider to establish a call with a client device associated with the client of the service provider;
   verifying the identity of the service provider;
   transmitting a PUSH notification to the client device indicating an incoming call is from a verified service provider, wherein the PUSH notification is sent to a mobile application associated with the service provider;
   wherein verifying the identity of the service provider comprises:
   providing a universal resource locator (URL) to the service provider, wherein the URL directs the service provider to a webpage for providing verification information;
   receiving, on the webpage, input from the service provider in response to a verification challenge; and
   verifying the received input matches preselected verification information associated with the client of the service provider.

21. The non-transitory computer readable medium of claim 20, further comprising:
   receiving verification information about the client;
   verifying the identity of the client; and
   establishing the call between the service provider and the client after both the identity of the service provider and the identity of the client are verified.

* * * * *

UNITED STATES PATENT AND TRADEMARK OFFICE
CERTIFICATE OF CORRECTION

PATENT NO. : 10,110,740 B2
APPLICATION NO. : 15/468805
DATED : October 23, 2018
INVENTOR(S) : Shay Ben Yacov It is certified that error appears in the above-identified patent and that said Letters Patent is hereby corrected as shown below:

In the Claims

In Claim 7, Column 14, the phrase "email text message" should be amended to read "email message"; and In Claim 18, Column 16, the phrase "email text message" should be amended to read "email message.".

Signed and Sealed this
Twentieth Day of August, 2024

Katherine Kelly Vidal
*Director of the United States Patent and Trademark Office*